United States Patent [19]

Howard et al.

[11] Patent Number: 5,258,884

[45] Date of Patent: Nov. 2, 1993

[54] MAGNETORESISTIVE READ TRANSDUCER CONTAINING A TITANIUM AND TUNGSTEN ALLOY SPACER LAYER

[75] Inventors: James K. Howard, Morgan Hill; Cherngye Hwang, San Jose, both of Calif.

[73] Assignee: International Business Machines Corporation, Armonk, N.Y.

[21] Appl. No.: 779,419

[22] Filed: Oct. 17, 1991

[51] Int. Cl.⁵ .............................................. G11B 5/39
[52] U.S. Cl. ................................................... 360/113
[58] Field of Search ...................... 360/113; 324/252; 338/32 R

[56] References Cited

U.S. PATENT DOCUMENTS

| | | | |
|---|---|---|---|
| 3,814,863 | 6/1974 | O'Day et al. | 360/113 |
| 3,864,751 | 2/1975 | Beaulieu et al. | 360/113 |
| 3,967,368 | 7/1976 | Brock et al. | 29/603 |
| 4,037,264 | 7/1977 | Barkley et al. | 360/129 |
| 4,663,685 | 5/1987 | Tsang | 360/113 |
| 4,668,913 | 5/1987 | Vinal | 360/113 |
| 4,713,708 | 12/1987 | Krounbi et al. | 360/113 |
| 4,785,366 | 11/1988 | Krounbi et al. | 360/113 |
| 4,843,506 | 6/1989 | Gill et al. | 360/113 |
| 4,879,619 | 11/1989 | Fontana, Jr. et al. | 360/113 |
| 4,914,538 | 4/1990 | Howard et al. | 360/113 |

Primary Examiner—Edward P. Westin
Assistant Examiner—Benjamin D. Driscoll
Attorney, Agent, or Firm—Leslie G. Murray

[57] ABSTRACT

A magnetoresistive (MR) read transducer has a thin film MR layer of ferromagnetic material and a nonmagnetic spacer layer in contact with the MR layer. The thin film spacer layer comprises an alloy of titanium (Ti) and tungsten (W) having a high resistivity. A thin film of soft magnetic material is deposited in contact with the nonmagnetic spacer layer so that the soft magnetic material is positioned parallel to, but spaced from, the MR layer. A feature of the invention is that the resistivity of the nonmagnetic spacer layer can be a specific value selected from a broad range of resistivity values by selecting the thickness, the Ti content, and/or the nitrogen content of the nonmagnetic spacer layer.

11 Claims, 4 Drawing Sheets

MAGNETORESISTIVE READ TRANSDUCER CONTAINING A TITANIUM AND TUNGSTEN ALLOY SPACER LAYER

DESCRIPTION

1. Field of Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and the direction of magnetic flux being sensed by the element.

The prior art also teaches that in order for an MR element to operate optimally, certain bias fields should be provided. In order to bias the MR element so that its response to a flux field is linear, a transverse bias field is generally provided. This bias field is normal to the plane of the magnetic media and parallel to the surface of the planar MR element.

U.S. Pat. No. 3,864,751 shows an MR read transducer in which transverse bias is produced by a soft magnetic bias film which is spaced from the MR element by an insulating layer. The material disclosed for the insulating layer is silicon dioxide about 2000 angstroms thick.

U.S. Pat. No. 3,814,863 and 3,967,368 disclose an MR read transducer in which the MR element is in contact with a high resistivity non-magnetic shunt film, and the MR element is magnetically biased by a portion of the MR sense current being shunted through the non-magnetic layer. The preferred material for the shunt film is titanium.

U.S. Pat. No. 4,663,685 discloses an MR read transducer in which transverse bias is produced by a soft magnetic film which is spaced from the MR element by a non-magnetic spacer layer. The preferred material for the spacer layer is tantalum, but $Al_2O_3$ and $SiO_2$ could also be used.

U.S. Pat. No. 4,713,708 discloses an MR read transducer in which transverse bias is provided by a soft magnetic film which is spaced from the MR element in the central region only of the MR element. The preferred material for the spacer layer is tantalum.

U.S. Pat. No. 4,879,619 discloses an MR read transducer comprising an MR layer in contact with a nonmagnetic spacer layer which serves to decouple the MR layer from a soft magnetic bias layer. The spacer layer comprises a material selected from the group consisting of nichrome and nichrome with chromium oxide.

To further enhance the operating parameters of small MR sensors, it would be desirable to have a nonmagnetic spacer layer with a high resistivity which remains stable, and which has no effect on the properties of adjacent layers.

SUMMARY OF THE INVENTION

It is therefore the principal object of the invention to provide a magnetoresistive (MR) sensor which includes a nonmagnetic spacer layer having a high resistivity in which the resistivity can be a specific value selected from a broad range of resistivity values.

In accordance with the invention, this objective is achieved by providing a thin film MR layer of ferromagnetic material and a nonmagnetic spacer in contact with the MR layer. The thin film spacer comprises an alloy of titanium (Ti) and tungsten (W) having a high resistivity. A thin film of soft magnetic material is deposited in contact with the nonmagnetic spacer layer so that the soft magnetic material is positioned parallel to, but spaced from, the MR layer.

It is a further feature of this invention that the resistivity of the nonmagnetic spacer layer can be a specific value selected from a broad range of resistivity values by selecting the thickness of the nonmagnetic spacer layer, the titanium content in the nonmagnetic spacer layer, and/or the nitrogen content in the nonmagnetic spacer layer.

The foregoing and other objects, features and advantages of the invention will be apparent from the following more particular description of a preferred embodiment of the invention as illustrated in accompanying drawings.

DESCRIPTION OF THE PREFERRED EMBODIMENT

Figure 1:
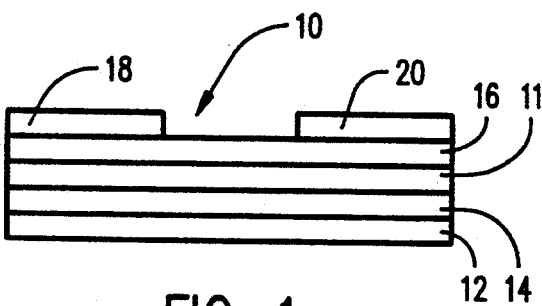
FIG. 1 is an end view of a specific embodiment of a magnetoresistive read transducer assembly according to the present invention.

A specific embodiment of the present invention will be described briefly in conjunction with FIG. 1. The magnetic read head comprises a magnetoresistive (MR) sensor 10, and transverse bias for MR sensor 10 is produced by soft magnetic film layer 12 which is separated from the MR layer 11 by a thin nonmagnetic spacer layer 14 whose purpose is to prevent a magnetic exchange coupling between the MR layer 11 and soft magnetic bias film layer 12. A layer of antiferromagnetic material 16 is deposited in direct contact with MR layer 11 to provide longitudinal bias by means of exchange coupling across the interface between the MR layer 11 and antiferromagnetic layer 16 as is known in the art. Conductor leads 18, 20 are also included for connection to a sensing means (not shown) for sensing an output signal as known in the art. The layer 12 is typically deposited on a substrate, such as the trailing end of an air bearing slider, which serves as the sensor carrier.

The nonmagnetic spacer layer 14 should be of considerably higher resistivity than the magnetic films it separates, so as not to shunt current from the MR layer 11. The spacer layer 14 must also be compatible with the process for manufacturing the MR sensor, and this means that the spacer layer must be deposited in situ, sequentially with the MR layer 11 and the soft magnetic bias layer 12 without vacuum break. In addition the electrical and material properties of the spacer layer 14 must be stable not only during deposition but also during subsequent process steps involving annealing at higher temperatures. The subsequent processing steps should leave the resistivity of the spacer layer 14 and the magnetic properties of the adjacent films 11 and 12 unaffected. For example, the resistivity of the spacer layer 14 could change as a result of phase and microstructure changes, and the magnetic properties of MR layer 11 and soft magnetic bias layer 12 could change should there be any atomic diffusion of the spacer material into either of the adjacent magnetic films 11 and 12, which could in turn quench the magnetic moments of the MR layer 11 and the soft magnetic bias layer 12 and shift the bias point of the MR sensor structure.

All of the above requirements are met according to the present invention, by the use of an alloy of titanium (Ti) and tungsten (W) as the material for the nonmagnetic spacer layer 14.

The use of an alloy of Ti and W as the material for the nonmagnetic spacer layer 14 not only permits the minimum requirements to be met so far as characteristics are concerned but also enables the selection of one important characteristic, the resistivity, over a wide range, all of which meet the minimum requirements for the specific application.

Figure 2:
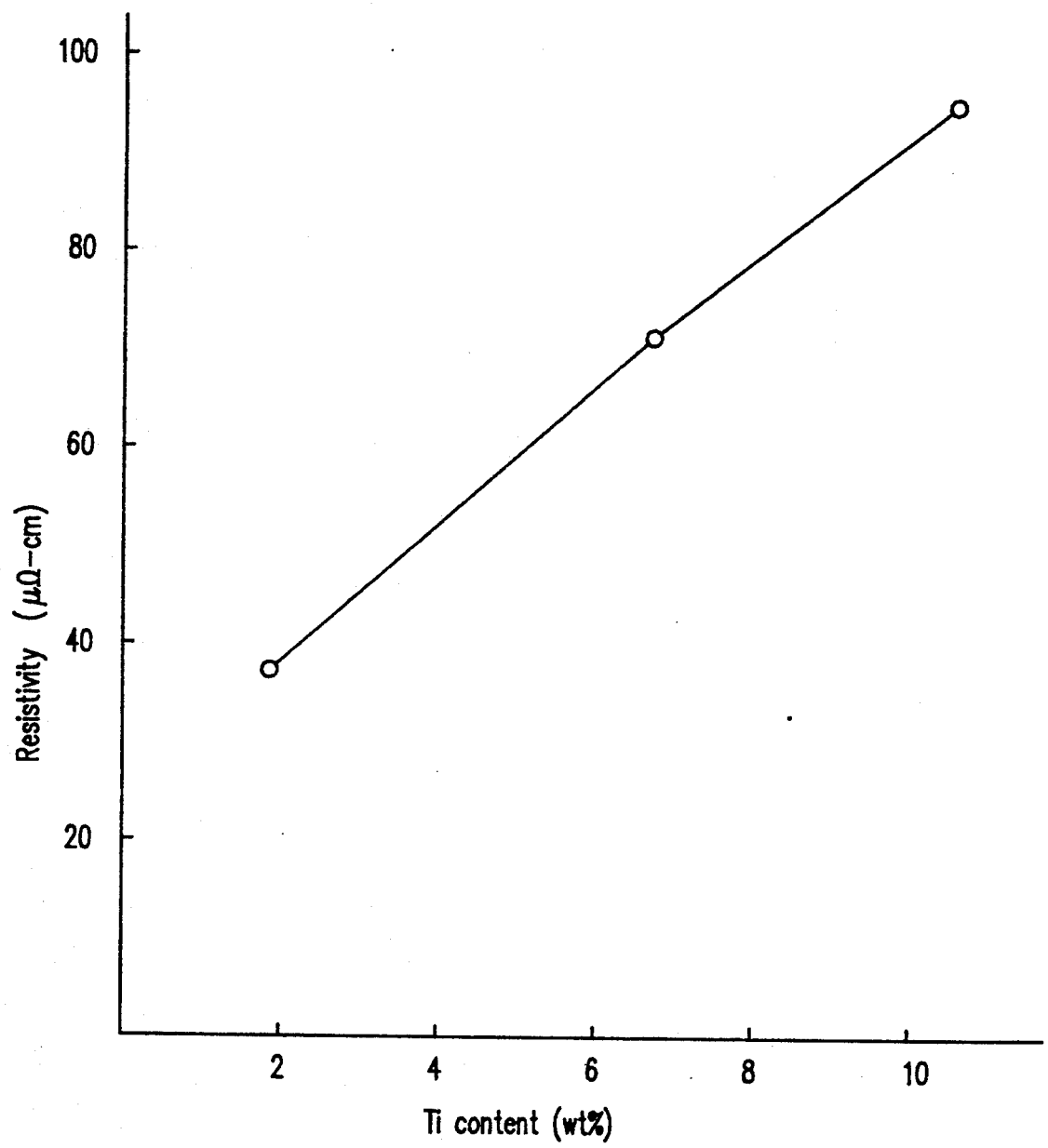
FIG. 2 is a graph of resistivity of a thin film made from an alloy of titanium and tungsten as a function of titanium content in the film.

One way in which a specific value of resistivity can be established is by choosing the Ti content of the TiW alloy comprising the non-magnetic spacer layer 14. FIG. 2 shows experimental data for a 2000 Å A Ti W film deposited by rf diode sputtering with background pressure better than $1 \times 10^{-7}$ torr. This graph shows that the resistivity is relatively linear at low levels of Ti and additional work has showed that the resistivity continues relatively linearly up to a Ti content of 30%.

Figure 3:
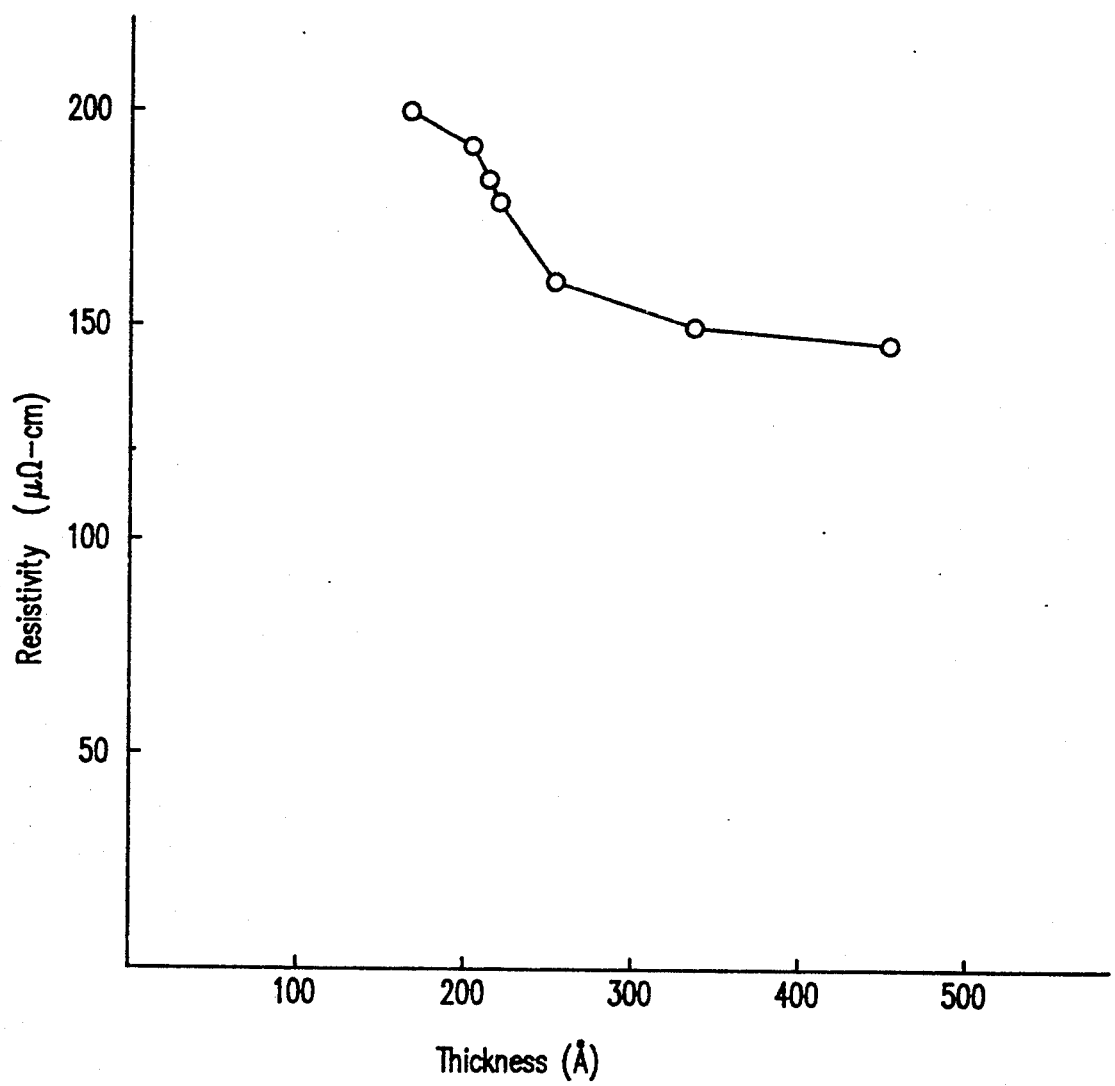
FIG. 3 is a graph of resistivity of a thin film made from an alloy of titanium and tungsten as a function of thickness of the film.

Another way in which a specific value of resistivity can be established is by choosing the thickness of the TiW film comprising the non-magnetic spacer layer 14. A specific example is shown in FIG. 3 for a TiW thin film having 10% by weight of Ti. This data shows that the resistivity increases with the decreasing TiW film thickness. It can be seen by referring to FIG. 3 that a TiW film with 10% Ti by weight that is 200Å thick has a resistivity of about 190 micro-ohm-cm., which is high enough to meet the requirements for a specific application.

Figure 5:
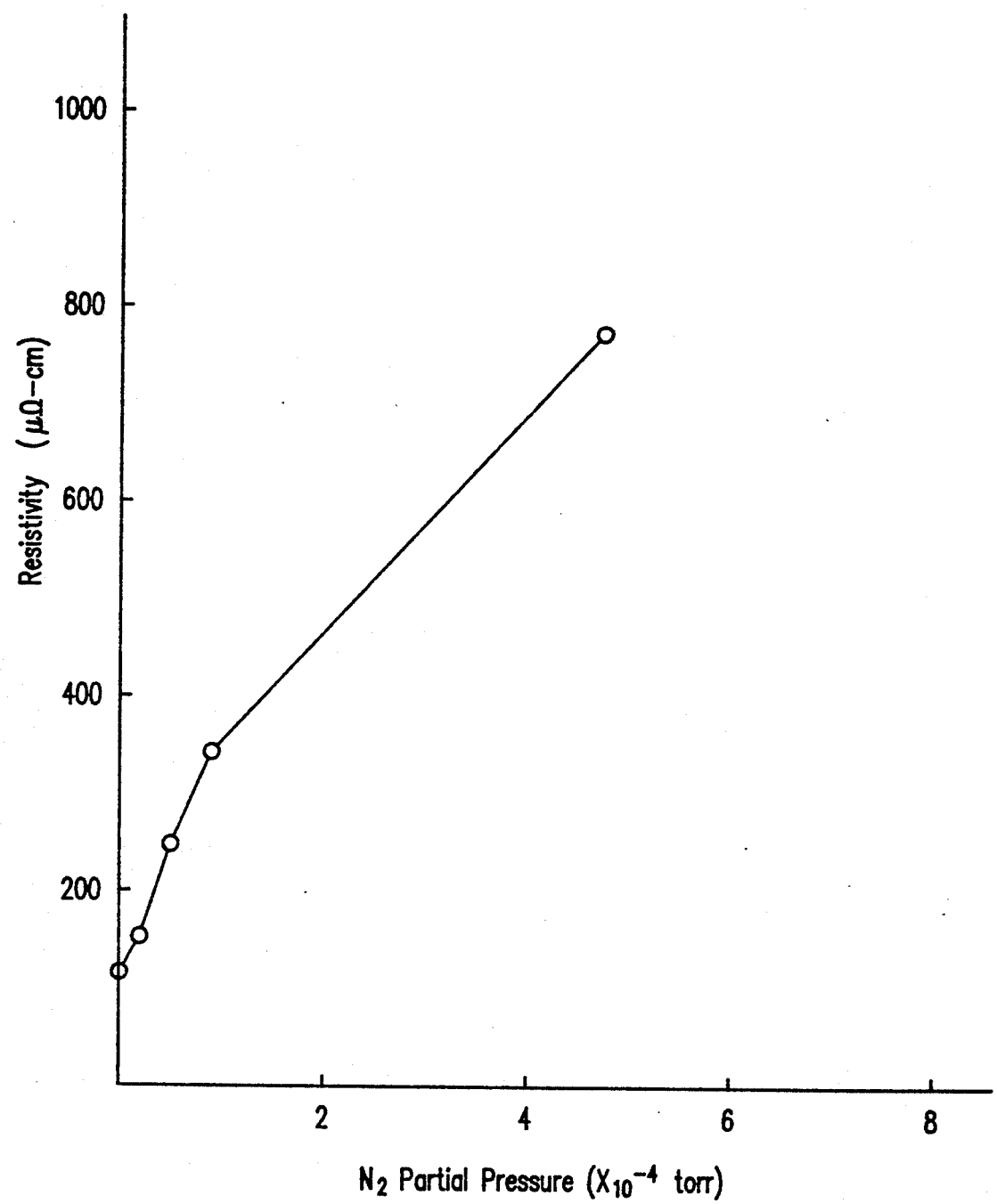
FIG. 5 is a graph of resistivity of a thin film made from an alloy of titanium and tungsten as a function of the nitrogen content of the film.

A further way in which a specific value of resistivity can be achieved is by the addition of a chosen amount of nitrogen ($N_2$) into the Argon (Ar) sputtering gas during the deposition of the TiW film comprising the non-magnetic spacer layer 14. FIG. 5 shows a graph of $N_2$ partial pressure versus resistivity for a TiW film having a thickness of 400Å and a Ti content of 15% by weight which had a resistivity of 105 micro-ohm-cm. in pure Ar sputtering gas. The amount of $N_2$ incorporated into the TiW film is proportional to the $N_2$ partial pressure. It can be seen by reference to FIG. 5 that the resistivity keeps increasing with increasing $N_2$ partial pressure. However, it was found that the TiW film loses its single phase bcc structure at higher $N_2$ levels, and transforms into a mixture of TiN crystalline and W-rich amorphous structure. It is preferred to keep the spacer 14 in the single phase structure.

In a specific embodiment in which the spacer layer was 200Å thick, had a Ti content of 15% by weight and 1-2% $N_2$ in the Ar gas, a film resulted which had a single phase bcc structure, resistivity of 500-700 micro-ohm-cm. and superior diffusion barrier properties.

The $N_2$ content of the resulting non-magnetic spacer layer is within the range of 1-2%.

Figure 4:
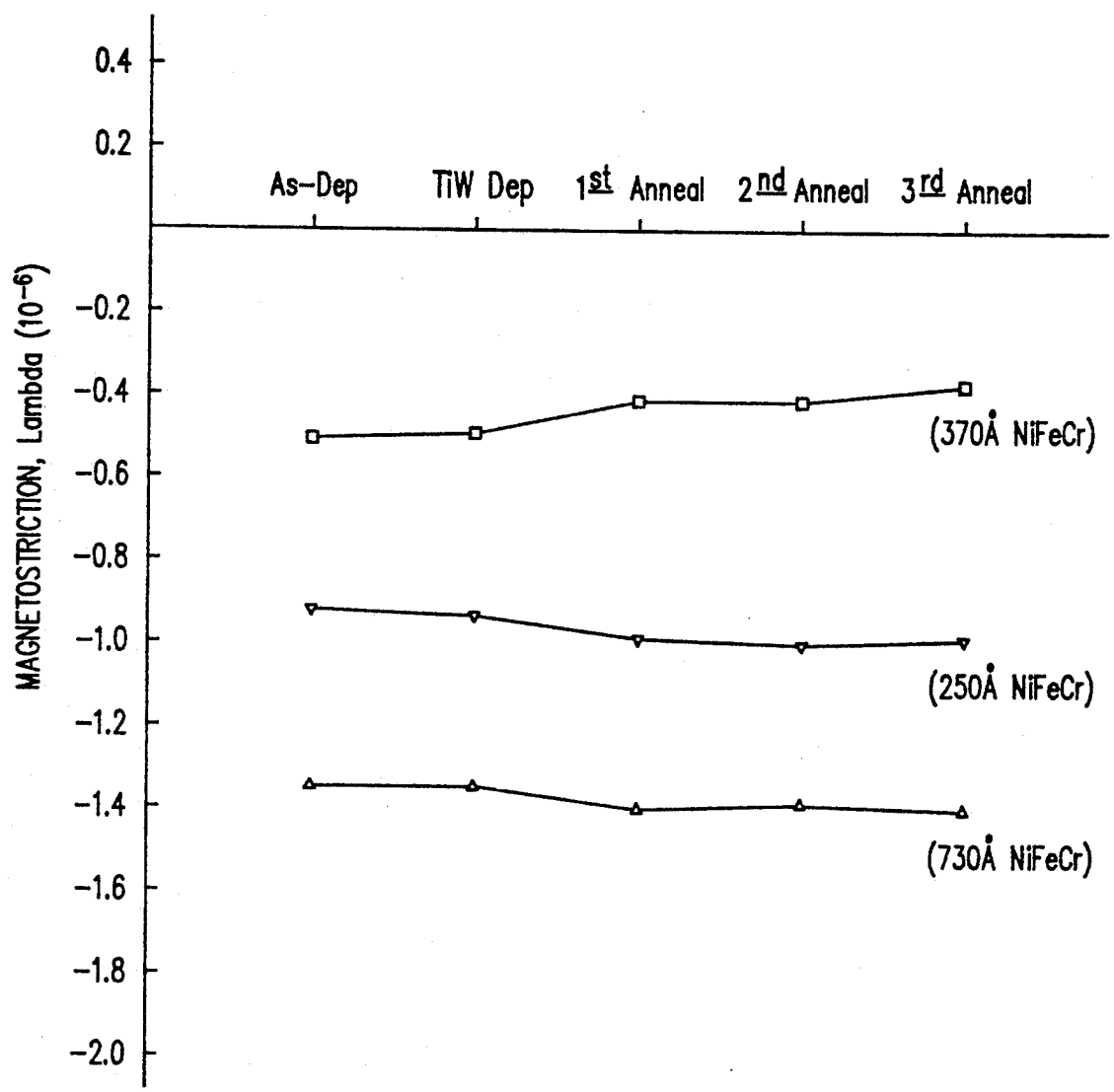
FIG. 4 is a graph of the magnetostriction of soft magnetic thin films with a titanium tungsten capping layer at different process conditions.

It is another requirement of the spacer layer design that the transducer maintain its magnetic characteristics constant under existing process annealing treatments, each of which involves annealing at a temperature of about 250° C. for a time of about 7 hours. FIG. 4 is a graph which shows one magnetic characteristic, magnetostriction, lambda, for a series of NiFeCr ferromagnetic layers. Lambda is shown for the film as initially deposited, after deposition of the TiW spacer layer and after each of three anneal treatments. This data shows very little change in Lambda as a result of that processing. In contrast, with some prior art spacer materials, a substantial change in Lambda takes place from the as-deposited value to the values after several process annealing treatments.

It can be seen that the use of TiW or TiW doped with $N_2$ is the spacer material in MR sensor permits significant design and manufacturing improvements. This use of TiW also affords many materials and processing advantages as well as added flexibility to design modification and extension.

While the invention has been particularly shown and described with reference to a preferred embodiment thereof, it will be understood by those skilled in the art that various other changes in the form and details may be made therein without departing from the spirit and scope of the invention.

We claim:

1. A magnetoresistive read transducer comprising:
    a thin magnetoresistive layer of ferromagnetic material;
    a nonmagnetic spacer layer in contact with said magnetoresistive layer, said nonmagnetic spacer layer comprising an alloy of titanium and tungsten having a high resistivity; and
    a thin film of soft magnetic material parallel to said magnetoresistive layer in contact with said nonmagnetic layer.

2. The magnetoresistive read transducer of claim 1 wherein the resistivity of said nonmagnetic spacer layer has a value predetermined by the titanium content of said nonmagnetic spacer layer.

3. The magnetoresistive read transducer of claim 2 wherein said titanium content of said nonmagnetic spacer layer is within the range of approximately 10-30% titanium by weight.

4. The magnetoresistive read transducer of claim 1 wherein the resistivity of said nonmagnetic spacer layer is established by the inclusion of a small nitrogen content in said nonmagnetic spacer layer.

5. The magnetoresistive read transducer of claim 4 wherein the nitrogen content of said nonmagnetic spacer layer is within the range of approximately 1-2%

6. The magnetoresistive read transducer of claim 1 wherein said thin film of soft magnetic material is formed on a substrate.

7. A magnetoresistive transducer comprising:
    a magnetoresistive layer of ferromagnetic material;
    a nonmagnetic spacer layer in contact with said magnetoresistive layer, said nonmagnetic spacer layer comprising an alloy of titanium, tungsten and nitrogen having a high resistivity; and
    a layer of soft magnetic material parallel to said magnetoresistive layer and in contact with said nonmagnetic layer, said layer of soft magnetic material spaced from said magnetoresistive layer by said nonmagnetic spacer layer.

8. A magnetoresistive transducer as in claim 7 wherein the nitrogen content of said nonmagnetic spacer layer is within the range of approximately 1 to 2 percent.

9. A magnetoresistive transducer as in claim 7 wherein the titanium content of said nonmagnetic spacer layer is within the range of approximately 10 to 30 percent by weight.

10. A magnetoresistive transducer as in claim 9 wherein the nitrogen content of said nonmagnetic spacer layer is within the range of approximately 1 to 2 percent and said titanium content is approximately 15 percent.

11. A magnetoresistive transducer as in claim 10 wherein the thickness of said nonmagnetic spacer layer is approximately 200 angstroms.

* * * * *